US012567620B2

(12) United States Patent
    Lee

(10) Patent No.: US 12,567,620 B2
(45) Date of Patent: Mar. 3, 2026

(54) BATTERY PACK

(71) Applicant: SK On Co., Ltd., Seoul (KR)

(72) Inventor: Seung Hun Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/514,148

(22) Filed: Nov. 20, 2023

(65) Prior Publication Data

US 2024/0178481 A1 May 30, 2024

(30) Foreign Application Priority Data

Nov. 24, 2022 (KR) ........................ 10-2022-0159269

(51) Int. Cl.
    *H01M 10/6557* (2014.01)
    *H01M 10/613* (2014.01)
    *H01M 10/656* (2014.01)
    *H01M 50/209* (2021.01)
    *H01M 50/242* (2021.01)
    *H01M 50/262* (2021.01)
    *H01M 50/271* (2021.01)

(52) U.S. Cl.
    CPC ..... *H01M 10/6557* (2015.04); *H01M 10/613* (2015.04); *H01M 10/656* (2015.04); *H01M 50/209* (2021.01); *H01M 50/242* (2021.01); *H01M 50/262* (2021.01); *H01M 50/271* (2021.01)

(58) Field of Classification Search
    CPC ........... H01M 10/6557; H01M 10/613; H01M 10/656; H01M 50/209; H01M 50/242; H01M 50/262; H01M 50/271
    See application file for complete search history.

(56) References Cited

U.S. PATENT DOCUMENTS

| | | | | |
|---|---|---|---|---|
| 8,771,382 B2 * | 7/2014 | Heise | .................. | H01M 10/625 |
| | | | | 429/120 |
| 9,577,227 B2 * | 2/2017 | Sumpf | ................ | H01M 50/204 |
| 10,141,615 B2 * | 11/2018 | Hatta | ................ | H01M 10/6554 |
| 2009/0142653 A1 * | 6/2009 | Okada | ................ | H01M 50/209 |
| | | | | 429/120 |
| 2009/0169983 A1 * | 7/2009 | Kumar | ............. | H01M 10/6552 |
| | | | | 429/120 |

(Continued)

FOREIGN PATENT DOCUMENTS

| | | | | |
|---|---|---|---|---|
| CN | 112151917 A | * | 12/2020 | ........ H01M 10/0413 |
| CN | 112868128 | | 5/2021 | |

(Continued)

OTHER PUBLICATIONS

European Patent Office, Appl. 23208375.8, Extended European Search Report; Apr. 15, 2024.

*Primary Examiner* — Kaity V Chandler
(74) *Attorney, Agent, or Firm* — Jones Day

(57) ABSTRACT

A battery pack includes a first sub-battery pack and a second sub-battery pack each including a plurality of battery module including a plurality of battery cells arranged in one direction, and stacked in a height direction of the plurality of battery cells; and a heat sink disposed between the first sub-battery pack and the second sub-battery pack and including a cooling flow path, wherein the first sub-battery pack and the second sub-battery pack are disposed symmetrically with respect to the heat sink.

16 Claims, 8 Drawing Sheets

(56)        References Cited

U.S. PATENT DOCUMENTS

| | | | |
|---|---|---|---|
| 2012/0021260 A1 * | 1/2012 | Yasui .................. | H01M 10/615 |
| | | | 429/71 |
| 2013/0244077 A1 | 9/2013 | Palanchon et al. | |
| 2014/0178721 A1 | 6/2014 | Chung et al. | |
| 2016/0226116 A1 | 8/2016 | Noh et al. | |
| 2016/0372805 A1 | 12/2016 | Kim et al. | |
| 2019/0379014 A1 * | 12/2019 | Jeon ...................... | F28D 9/0062 |
| 2020/0203784 A1 * | 6/2020 | Shimizu ............ | H01M 10/6555 |
| 2020/0235445 A1 * | 7/2020 | Kamo ............... | H01M 10/6552 |
| 2021/0122263 A1 * | 4/2021 | Dziubinschi ...... | H01M 10/6554 |
| 2021/0313635 A1 | 10/2021 | Wang et al. | |
| 2021/0391609 A1 * | 12/2021 | Jeon ...................... | H01M 50/211 |
| 2022/0344742 A1 * | 10/2022 | Nomizo .............. | H01M 10/647 |
| 2022/0371419 A1 | 11/2022 | Fernandez-Galindo et al. | |
| 2023/0291026 A1 * | 9/2023 | Yoo ...................... | H01M 50/342 |
| 2023/0378568 A1 | 11/2023 | Park et al. | |

FOREIGN PATENT DOCUMENTS

| | | | | |
|---|---|---|---|---|
| CN | 114267901 A | * | 4/2022 | ............. Y02E 60/10 |
| CN | 217589202 | | 10/2022 | |
| CN | 115377596 | | 11/2022 | |
| CN | 117080621 A | * | 11/2023 | .......... H01M 10/613 |
| JP | 2014-146461 | | 8/2014 | |
| KR | 10-2015-0100365 | | 9/2015 | |
| KR | 10-2016-0094226 | | 8/2016 | |
| KR | 10-2022-0019000 | | 2/2022 | |
| KR | 20220053312 A | * | 4/2022 | .......... H01M 10/613 |
| KR | 10-2022-0131782 | | 9/2022 | |
| WO | 2013/048060 | | 4/2013 | |
| WO | WO-2021025321 A1 | * | 2/2021 | .......... H01M 10/613 |

* cited by examiner

BATTERY PACK

CROSS-REFERENCE TO RELATED APPLICATION(S)

This patent document claims the priority and benefits of Korean Patent Application No. 10-2022-0159269 filed on Nov. 24, 2022, the disclosure of which is incorporated herein by reference in its entirety.

TECHNICAL FIELD

The present disclosure generally relates to a battery pack.

BACKGROUND

A secondary battery refers to a battery which may be repeatedly charged and discharged as mutual conversion between chemical energy and electrical energy of the secondary battery is reversible.

Such a secondary battery may be used as an energy source for electric vehicles, hybrid vehicles, and energy storage systems (ESS), including mobile devices.

A secondary battery may have a form in which one or more battery cells including flexible pouch-type battery cells or rigid prismatic or cylindrical can-type battery cells are electrically connected to each other. Also, in the case of an electric vehicle requiring high output characteristics, a secondary battery may be used in the form of a battery pack in which one or plurality of battery modules in which one or more cell stacks of a plurality of battery cells are electrically connected to each other are electrically connected to each other.

Performance of a secondary battery may be greatly affected by temperature. In particular, when a temperature of the secondary battery increases further than an appropriate temperature, performance of the secondary battery may deteriorate, and, there may be a risk of explosion or ignition. Such a risk may increase in a battery module including one or more battery cells or a battery pack including one or more battery modules.

Accordingly, a battery module and/or pack may need to be configured to cool battery cells, such as a heat sink, and a method of cooling the battery module and/or pack more efficiently has been studied.

SUMMARY

An embodiment of the present disclosure is to provide a battery pack having an efficient cooling structure.

An embodiment of the present disclosure is to provide a battery pack having increased energy density.

The battery pack of the present disclosure may be widely applied in green technology fields such as electric vehicles, battery charging stations, and other battery-based solar and wind power generation. Also, the battery pack of the present disclosure may be used in eco-friendly electric vehicles, hybrid vehicles, and the like, to prevent climate change by suppressing air pollution and greenhouse gas emissions.

According to an aspect of the present disclosure, a battery pack includes a first sub-battery pack and a second sub-battery pack each including a plurality of battery module including a plurality of battery cells arranged in one direction, and stacked in a height direction of the plurality of battery cells; and a heat sink disposed between the first sub-battery pack and the second sub-battery pack and including a cooling flow path, wherein the first sub-battery pack and the second sub-battery pack are disposed symmetrically with respect to the heat sink.

The plurality of battery cell includes a case and an electrode terminal protruding to one side of the case, and the other side of the case in which the electrode terminal does not protrude may be disposed toward the heat sink.

The plurality of battery modules may include a busbar electrically connecting the electrode terminals to each other and disposed to cover the plurality of battery cells on one side of the case.

The battery pack may further include a heat conductive member disposed between the plurality of battery modules and the heat sink.

The battery pack may further include a pack frame coupled to the plurality of battery modules; and a pack cover coupled to the pack frame and disposed on the other side of the heat sink with respect to the plurality of battery modules.

The battery pack may further include a compression pad disposed between the plurality of battery module and the pack cover.

The heat sink may include a first sub-heat sink disposed on the first sub-battery pack side and cooling the first sub-battery pack; and a second sub-heat sink disposed on the second sub-battery pack side and cooling the second sub-battery pack, and the first sub-heat sink and the second sub-heat sink may be structurally connected to each other.

The first sub-heat sink may include a first cooling flow path, and the second sub-heat sink may include a second cooling flow path, and the first cooling flow path and the second cooling flow path may form a flow path of coolant, independent of each other.

The heat sink may further include a hollow portion formed between the first sub-heat sink and the second sub-heat sink.

The pack cover may protrude toward the pack frame and may further include a fastening portion coupled to the pack frame.

The pack cover may include a lower pack cover forming a bottom surface and an upper pack cover forming an upper surface, and a reinforcement member extending in a width direction of the lower pack cover and protruding in an opposite direction to the fastening portion is further disposed in the lower pack cover.

The first sub-battery pack and the second sub-battery pack may include a plurality of battery modules forming an n×m array (where n and m are natural numbers of 1 or more).

According to an aspect of the present disclosure, a battery pack includes a heat sink; and a plurality of battery modules disposed on upper and lower sides of the heat sink, respectively, and including a plurality of battery cells arranged in one direction, wherein the plurality of battery cells are arranged such that the electrode terminal faces an opposite side of the heat sink.

The battery pack may further include a pack cover disposed to cover each of the plurality of battery modules on the side toward the electrode terminal faces.

The battery pack may further include a pack frame disposed between the heat sink and the pack cover and coupled to at least one of the plurality of battery modules, the heat sink and the pack cover.

BRIEF DESCRIPTION OF DRAWINGS

Certain aspects, features, and advantages of the present disclosure are illustrated by the following detailed description with reference to the accompanying drawings.

DETAILED DESCRIPTION

Figure 1:
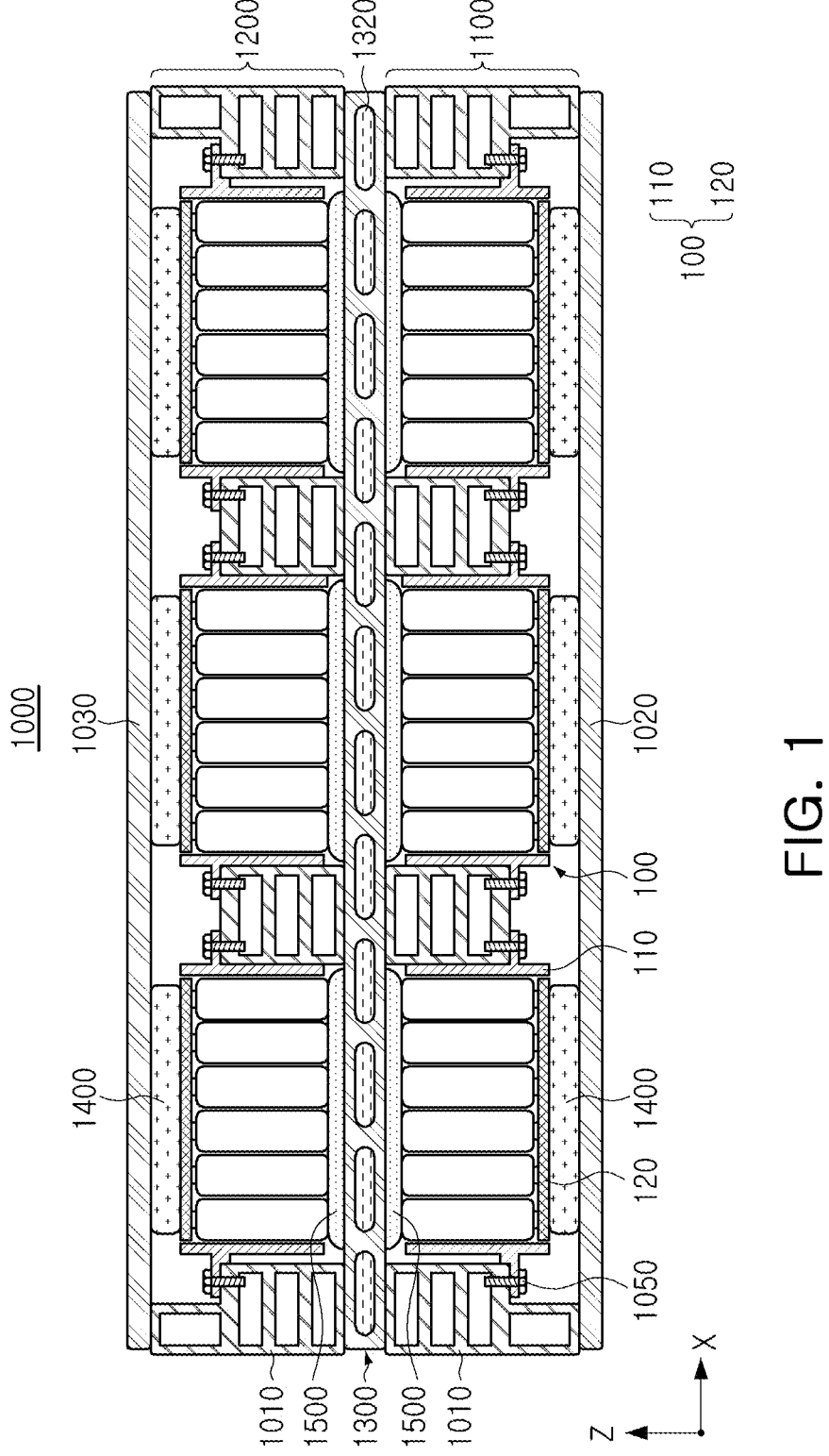
FIG. 1 is a cross-sectional diagram illustrating a battery pack taken in the X-direction according to an embodiment of present disclosure, viewed from the side.

The embodiments of the present disclosure are illustrated in embodiments with reference to the accompanying drawings.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another embodiment without departing from the spirit and scope of the present disclosure. Further, modifications of positions or arrangements of elements in embodiments may be made without departing from the spirit and scope of the present disclosure. The following detailed description is, therefore, not to be taken in a limiting sense, and the scope of the present invention are defined only by appended claims, appropriately interpreted, along with the full range of equivalents to which the claims are entitled.

In the drawings, same elements will be indicated by same reference numerals. For ease of description, the same reference numerals may be used in different embodiments. That is, even when components having the same reference numerals are illustrated in a plurality of drawings, the plurality of drawings do not all refer to the same embodiment.

An expression used in the singular encompasses the expression of the plural, unless it has a clearly different meaning in the context. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the descriptions below, the terms such as an upper side, an upper portion, a lower side, a lower portion, a side surface, a front surface, a rear surface, and the like, may be denoted with respect to the directions indicated in the drawings, and may be represented differently when the direction of the component changes.

The terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right in the embodiments.

The present disclosure relates to a battery pack, and more specifically, to a battery pack mounted on a vehicle, particularly a large vehicle such as a truck or a van.

A battery pack according to an embodiment of the present disclosure will be described with reference to FIGS. 1 to 3.

FIG. 1 is a cross-sectional diagram illustrating a battery pack taken in the X-direction according to an embodiment. FIG. 2 is a cross-sectional diagram illustrating a battery pack taken in the Y-direction according to an embodiment. FIG. 3 is a plan diagram illustrating a battery pack according to an embodiment.

Figure 2:
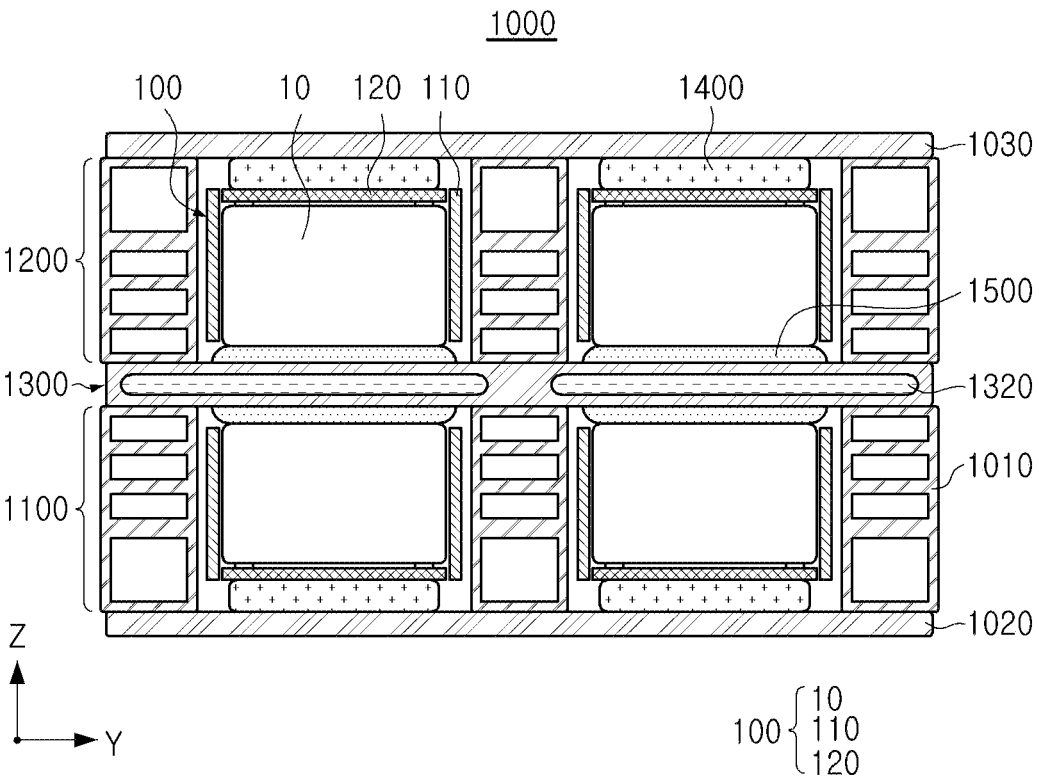
FIG. 2 is a cross-sectional diagram illustrating a battery pack taken in the Y-direction according to an embodiment of present disclosure, viewed from the side.

Referring to FIGS. 1 and 2, a battery pack 1000 according to an embodiment may include a plurality of battery modules 100 disposed in a stack in a height direction of the battery pack 1000 (the Z-direction in the drawing).

In an embodiment, the battery pack 1000 may include a first sub-battery pack 1100 disposed in a lower portion in the Z-direction and a second sub-battery pack 1200 disposed in an upper portion in the Z-direction, and the first sub-battery pack 1100 and the second sub-battery pack 1200 may include one or more battery modules 100.

The first sub-battery pack 1100 and the second sub-battery pack 1200 may include a plurality of battery modules 100 arranged in the X-direction and the Y-direction in the drawing. The first sub-battery pack 1100 and the second sub-battery pack 1200 may include a plurality of battery modules 100 forming an n×m array (n and m are natural numbers greater than or equal to 1), for example, as illustrated in the drawing, the plurality of battery modules 100 forming a 2×3 array (the Y-direction×the X-direction). Since the first sub-battery pack 1100 and the second sub-battery pack 1200 are arranged in the Z-direction, the plurality of battery module 100 in an embodiment may form a 2×3×2 array.

The battery module 100 may include a plurality of battery cells 10 arranged in one direction. For example, the battery module 100 may include a plurality of battery cells 10 arranged in the X-direction in the drawing.

In an embodiment, the plurality of battery cell 10 may be configured as a prismatic battery cell. A prismatic battery cell may refer to a battery cell in which the case including an electrode assembly and electrolyte may have a flat and angular shape. Referring to the drawing, the plurality of battery cells 10 may be arranged in the X-direction such that the wide surfaces of the case oppose each other.

Also, in an embodiment, the plurality of battery cell 10 may include an electrode terminal 15 protruding externally, and the plurality of battery cell 10 may be electrically connected to each other through the electrode terminal 15. The plurality of battery cells 10 may be arranged such that the electrode terminals 15 may be disposed in the same direction. Referring to the drawing, the plurality of prismatic battery cells 10 may be arranged such that the electrode terminal 15 may be disposed in the Z-direction, and in this case, the Z-direction may refer to one of the upward and downward directions.

The battery module 100 may include a module housing 110 forming a side surface of the battery module 100. In an embodiment, the module housing 110 may be disposed to surround the side surface of the plurality of battery cell 10, and may not surround an upper surface and a lower surface of the plurality of battery cell 10.

In embodiments, the general term "module housing" 110 may be used, but the module housing 110 may include a plurality of plates. For example, the module housing 110 may include a pair of end plates disposed in the length direction of the battery module 100 and/or a pair of side plates disposed in the width direction of the battery module 100.

The battery module 100 may include a busbar assembly 120 disposed on one side of the plurality of battery cells 10. The electrode terminal 15 may protrude to one side of the plurality of battery cell 10, and the busbar assembly 120 may be disposed on one side on which the electrode terminal 15 of the plurality of battery cell 10 protrudes. In the drawing, the busbar assembly 120 may be disposed in the Z-direction of the plurality of battery cell 10.

The busbar assembly 120 may include a busbar 121 electrically connected to the electrode terminal 15 and a busbar frame 122 on which the busbar 121 is disposed. Also, although not specifically illustrated in the drawing, the busbar assembly 120 may include an FPCB electrically connected to the busbar 121 and receiving voltage and temperature information of the plurality of battery cells 10.

The busbar frame 122 may be formed of an electrically insulating material and may be disposed to cover the upper surface or the lower surface on which the electrode terminal 15 of the plurality of battery cells 10 protrudes. In an embodiment, the busbar frame 122 may include a plurality of holes in a position corresponding to the electrode terminal 15, and the electrode terminal 15 may be exposed through the plurality of holes.

The busbar 121 may be disposed in the busbar frame 122. The busbar 121 may electrically interconnect the electrode terminals 15 of the plurality of battery cells 10 exposed through the busbar frame 122. In the drawing, an embodiment in which the plurality of battery cells 10 may be connected to each other in series through the busbar 121 is illustrated, but alternatively, the plurality of battery cells 10 may be connected to each other in parallel.

The battery pack 1000 may include a pack frame 1010 and pack covers 1020 and 1030 forming the exterior of the battery pack 1000 or the sub-battery packs 1100 and 1200.

The pack frame 1010 may form the side surface of the battery pack 1000 or the sub-battery pack 1100 and 1200, and may be disposed between the plurality of battery module 100 and may partition a space 1011 in which the individual battery modules 100 are disposed. Referring to the drawing, the pack frame 1010 may be coupled to the module housing 110 by the fastening bolt 1050, and accordingly, the battery module 100 may be fixed to the pack frame 1010.

The pack covers 1020 and 1030 may form the upper surface and the lower surface of the battery pack 1000. Alternatively, on the side surface of the sub-battery pack 1100 and 1200, the pack covers 1020 and 1030 may form the upper surface or the lower surface of the sub-battery pack 1100 and 1200.

The pack covers 1020 and 1030 may be coupled with the pack frame 1010. In an embodiment, the pack covers 1020 and 1030 may have a flat shape, and the shapes of pack covers 1020 and 1030 may be varied.

In the battery pack 1000 according to an embodiment, the first sub-battery pack 1100 and the second sub-battery pack 1200 may be stacked in the Z-direction (or the vertical direction), which is the height direction of the plurality of battery cell 10. The heat sink 1300 may be disposed between the first sub-battery pack 1100 and the second sub-battery pack 1200. In other words, the battery pack 1000 may have the first sub-battery pack 1100, the heat sink 1300 and the second sub-battery pack 1200 disposed in order along the Z-direction (and the pack covers 1020 and 1030 may be disposed below the first sub-battery pack 1100 and above the second sub-battery pack 1200).

According to an embodiment, the first sub-battery pack 1100 and the second sub-battery pack 1200 may share the heat sink 1300, which may indicate that the plurality of battery modules 100 included in the battery pack 1000 may share the heat sink 1300.

The first sub-battery pack 1100 and the second sub-battery pack 1200 may be disposed such that the other side from which the electrode terminal 15 of the plurality of battery module 100 does not protrude may face the heat sink 1300 to share the heat sink 1300. Accordingly, the first sub-battery pack 1100 and the second sub-battery pack 1200 may be symmetrical with respect to the heat sink 1300 as illustrated in the drawing.

More specifically, the directions in which the busbar assembly 120 is disposed may be different in the plurality of battery module 100 included in the first sub-battery pack 1100 and the plurality of battery module 100 included in the second sub-battery pack 1200.

For example, the battery module 100 may be disposed such that the busbar assembly 120 may face the pack covers 1020 and 1030, and accordingly, the plurality of battery module 100 included in the first sub-battery pack 1100 may be disposed such that the busbar assembly 120 may face a lower portion of the battery pack 1000, and the plurality of battery modules 100 included in the second sub-battery pack 1200 may be disposed such that the busbar assembly 120 may faces an upper portion of the battery pack 1000. In other words, the plurality of battery module 100 included in the first sub-battery pack 1100 may be disposed such that the electrode terminal 15 of the plurality of battery cell 10 included in the battery module 100 may face a lower portion of the battery pack 1000, and the plurality of battery module 100 included in the second sub-battery pack 1200 may be disposed such that electrode terminal 15 of the plurality of battery cells 10 included in the battery module 100 may face an upper portion of the battery pack 1000.

The heat sink 1300 may include a metal plate 1310 coupled to the pack frame 1010 and a cooling flow path 1320 through which a refrigerant provided in the metal plate 1310 flows. Also, although not specifically illustrated in the drawing, the heat sink 1300 may include an inlet for supplying coolant to the cooling flow path 1320 and an outlet for discharging the coolant flowing in the cooling flow path 1320.

Figure 4:
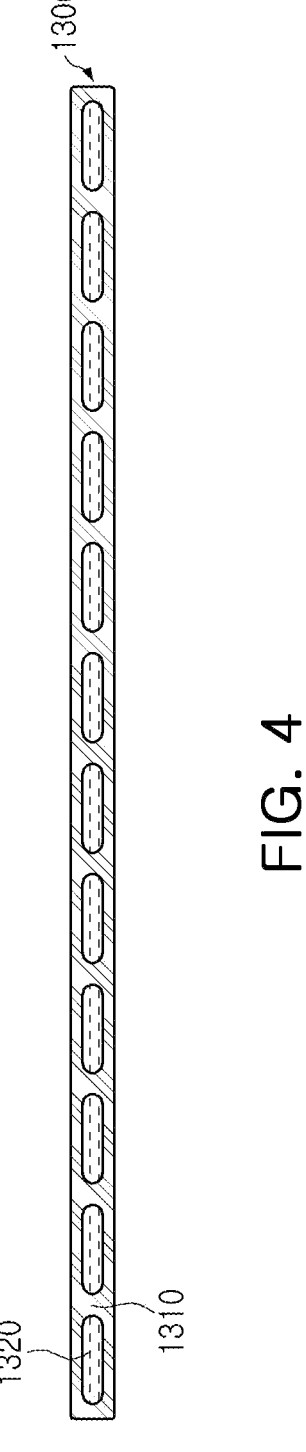
FIG. 4 is a diagram illustrating a heat sink according to an embodiment of present disclosure.

FIG. 4 is a diagram illustrating a heat sink according to an embodiment.

The heat sink 1300 may be manufactured using an extrusion method. For example, the first surface on the first sub-battery pack 1100 side and the second surface on the second sub-battery pack 1200 side may be combined with each other with the cooling flow path 1320 interposed therebetween.

In another embodiment, the heat sink 1300 may be manufactured using a brazing method. For example, a first plate including a first surface on the first sub-battery pack 1100 side and a second plate including a second surface on the second sub-battery pack 1200 side may be manufactured through forming or sheet pressing processes. The first plate and the second plate may be attached to each other by applying a solvent to each adhesive portion and applying heat.

According to an embodiment, the compression pad 1400 may be further disposed between the plurality of battery module 100 and the pack covers 1020 and 1030. The compression pad 1400 may maintains a distance between the plurality of battery module 100 and the pack covers 1020 and 1030, may fill the space formed between the plurality of battery module 100 and the pack covers 1020 and 1030 in a state in which the pack covers 1020 and 1030 and the pack frame 1010 are coupled to each other, and may absorb external impacts. Also, the compression pad 1400 may contribute to cooling the plurality of battery module 100 by pressing plurality of battery module 100 to the heat sink 1300. For example, the compression pad 1400 may be formed of polyurethane foam or a material having similar properties.

Also, according to an embodiment, a heat conductive member 1500 may be further disposed between the plurality of battery module 100 and the heat sink 1300. The heat conductive member 1500 may fix the plurality of battery module 100 to the heat sink 1300 on the lower surface such that heat generated from the plurality of battery cell 10 may be swiftly transferred to the heat sink 1300. For example, the heat conductive member 1500 may be formed of a thermal resin material having excellent heat conduction properties and adhesive strength. More specifically, silicone, acrylic, or the like, may be used as a material of the heat conductive member 1500. Also, the heat conductive member 1500 may be provided in the form of paste or pad.

Since the plurality of battery modules 100 are stacked in the Z-direction in addition to the X and the Y-direction, the battery pack 1000 according to an embodiment may implement high capacity. Accordingly, the battery pack 1000 according to an embodiment may be suitable for large vehicles such as trucks or vans which require high capacity and have relatively less limitations in space (particularly, less limitations in space in the height direction of the battery pack 1000).

Also, in the battery pack 1000 according to an embodiment, the first sub-battery pack 1100 and the second sub-battery pack 1200, including the plurality of battery module 100, may be disposed vertically with the heat sink 1300 therebetween, such that the battery pack 1000 may have an efficient cooling structure in which the plurality of battery modules 100 disposed upwardly and downwardly may be cooled by a single heat sink 1300.

Also, according to the embodiment including a single heat sink 1300 as described above, since a minimum number of the heat sink 1300 component is provided, costs may be reduced and energy density may be improved.

In particular, coolant may leak during the process of supplying the coolant to the heat sink 1300 or discharging the coolant from the heat sink 1300. Since the battery pack 1000 according to an embodiment includes a minimum number of heat sink 1300 component, the leak point of coolant may also be reduced.

In the description below, a battery pack according to another embodiment will be described with reference to FIGS. 5 and 6.

Figure 5:
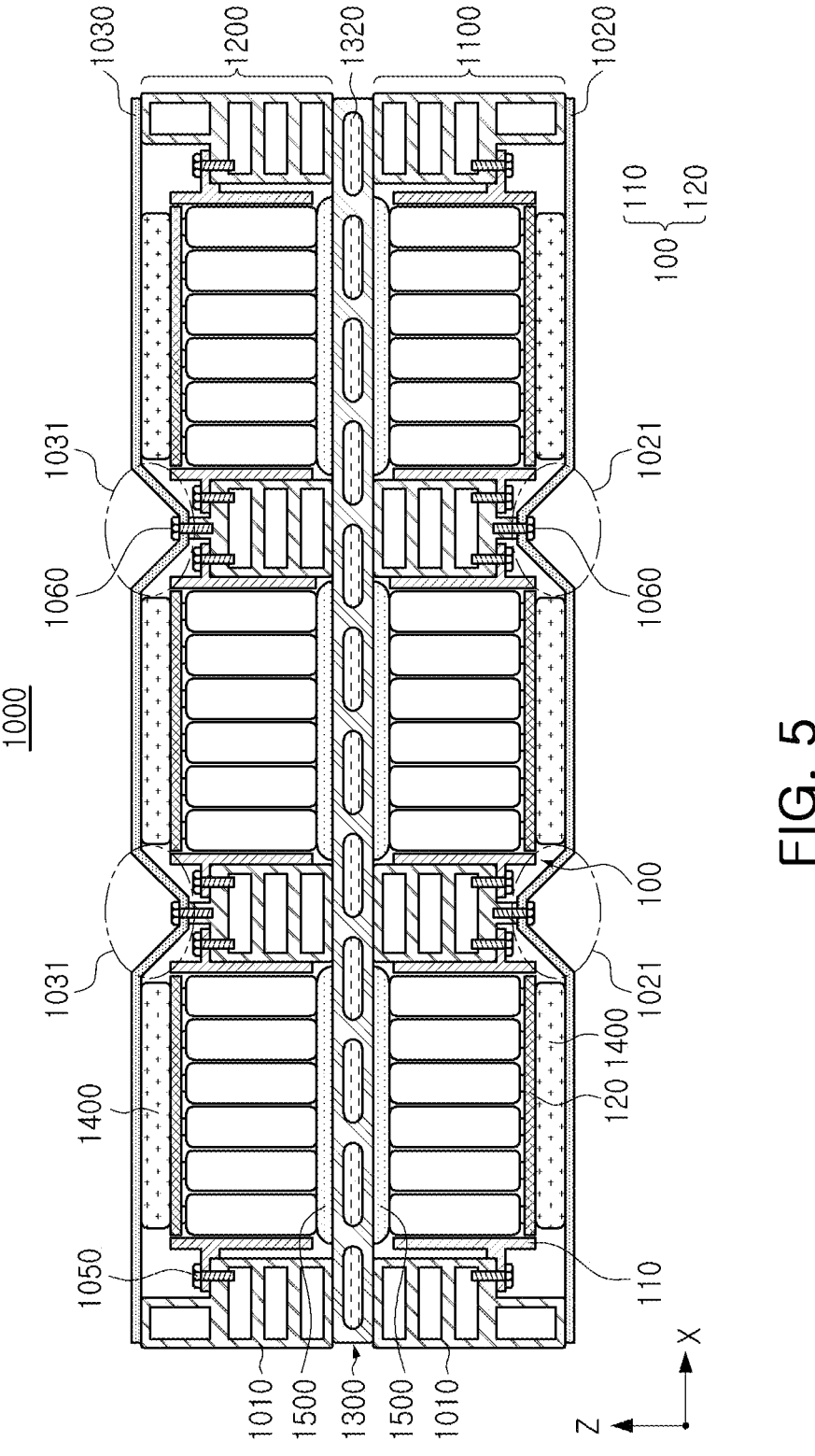
FIG. 5 is a cross-sectional diagram illustrating a battery pack taken in the X-direction according to another embodiment of present disclosure, viewed from the side.

FIG. 5 is a cross-sectional diagram illustrating a battery pack taken in the X-direction according to another embodiment, viewed from the side. FIG. 6 is a cross-sectional diagram illustrating a battery pack taken in the X-direction according to a modified embodiment, viewed from the side.

Figure 3:
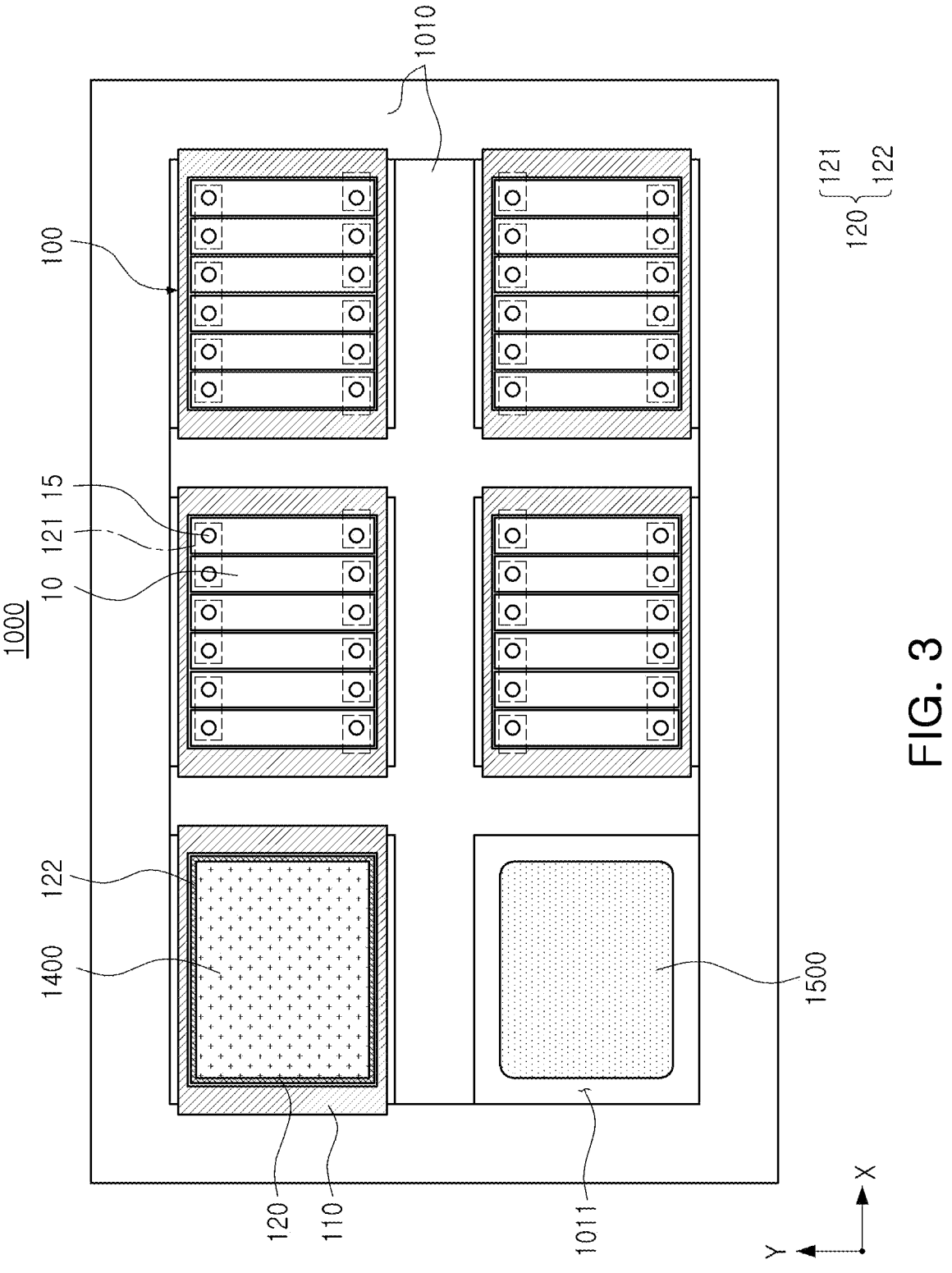
FIG. 3 is a plan diagram illustrating a battery pack according to an embodiment of present disclosure.

The battery pack 1000 according to another embodiment may include pack covers 1020 and 1030 having shapes different from those of the battery pack 1000 illustrated in FIGS. 1 to 3, which may increase structural stability of the battery pack 1000.

Referring to FIG. 5, the pack covers 1020 and 1030 may include fastening portions 1021 and 1031 protruding toward the pack frame 1010, and the pack covers 1020 and 1030 may be further coupled to the pack frame 1010 through the fastening portions 1021 and 1031.

The pack covers 1020 and 1030 may include fastening portions 1021 and 1031 in a portion not coupled to the pack frame 1010 in the embodiments in FIGS. 1 to 3, that is, a portion facing the pack frame 1010 disposed between the plurality of battery modules 100. The pack covers 1020 and 1030 and the pack frame 1010 may be coupled to each other by the fastening portions 1021 and 1031 and the fastening bolt 1060 penetrating through the pack frame 1010 disposed on the internal side of the fastening portions 1021 and 1031.

According to another embodiment, the pack frame 1010 and the pack covers 1020 and 1030, which form the skeleton of the battery pack 1000, may be combined at more points, such that stability of the battery pack 1000 on the structural side surface may be increased.

Figure 6:
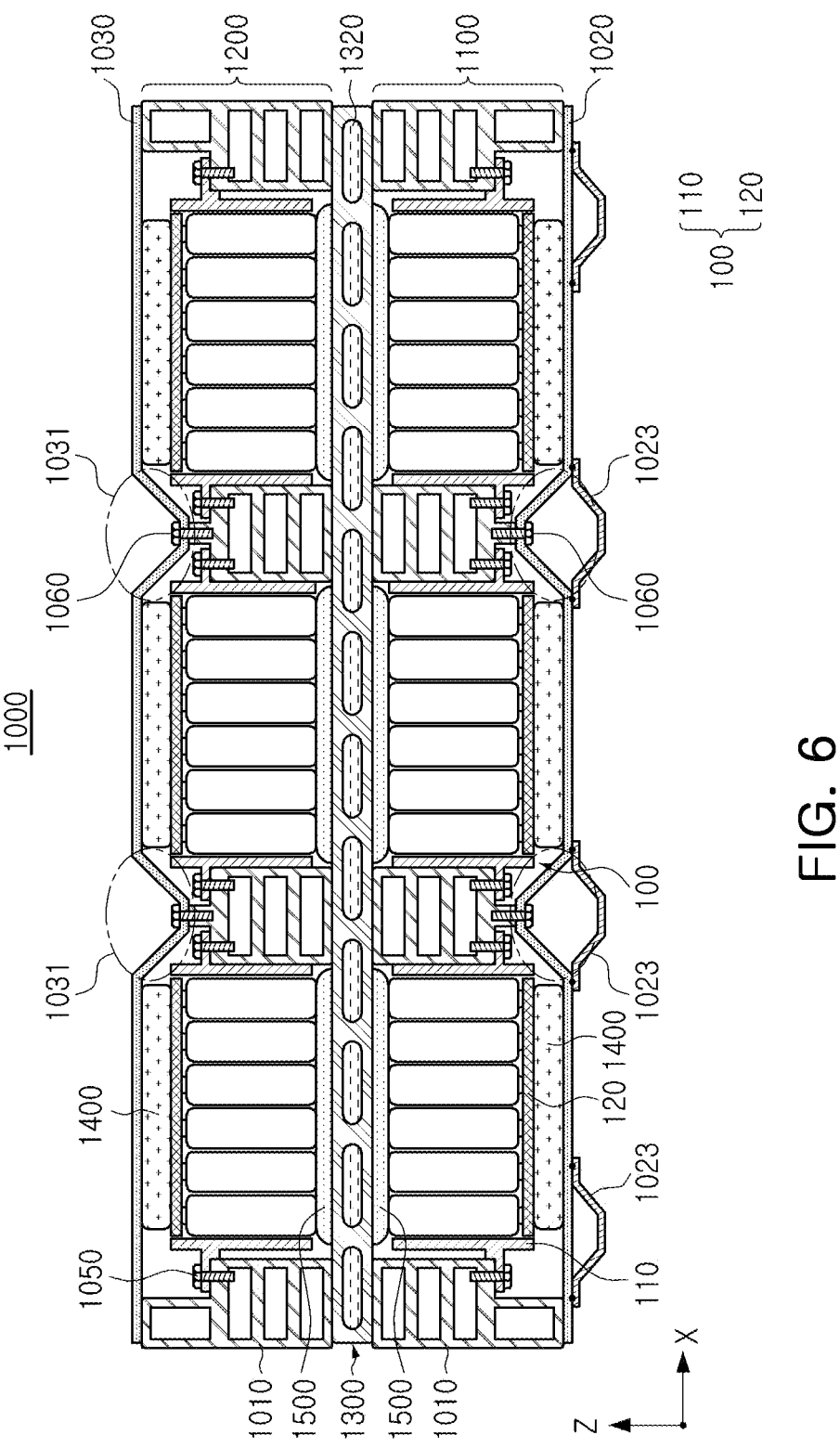
FIG. 6 is a cross-sectional diagram illustrating a battery pack taken in the X-direction according to a modified embodiment of present disclosure, viewed from the side.

Referring to FIG. 6, a plurality of reinforcement member 1023 may be further disposed on the pack cover 1020 (hereinafter, a lower pack cover) disposed below the first sub-battery pack 1100 to increase structural rigidity of the battery pack 1000.

The reinforcement member 1023 may extend in the width direction of the lower pack cover 1020 (or the battery pack 1000) and may have a bar shape protruding in the opposite direction to the fastening portion 1021.

The reinforcement member 1023 may include a portion in which the fastening portion 1021 is formed and may be spaced in the length direction of the lower pack cover 1020 by a predetermined distance, and may be coupled to the lower pack cover 1020 through welding.

In the description below, a battery pack according to another embodiment will be described with reference to FIGS. 7 and 8.

Figure 7:
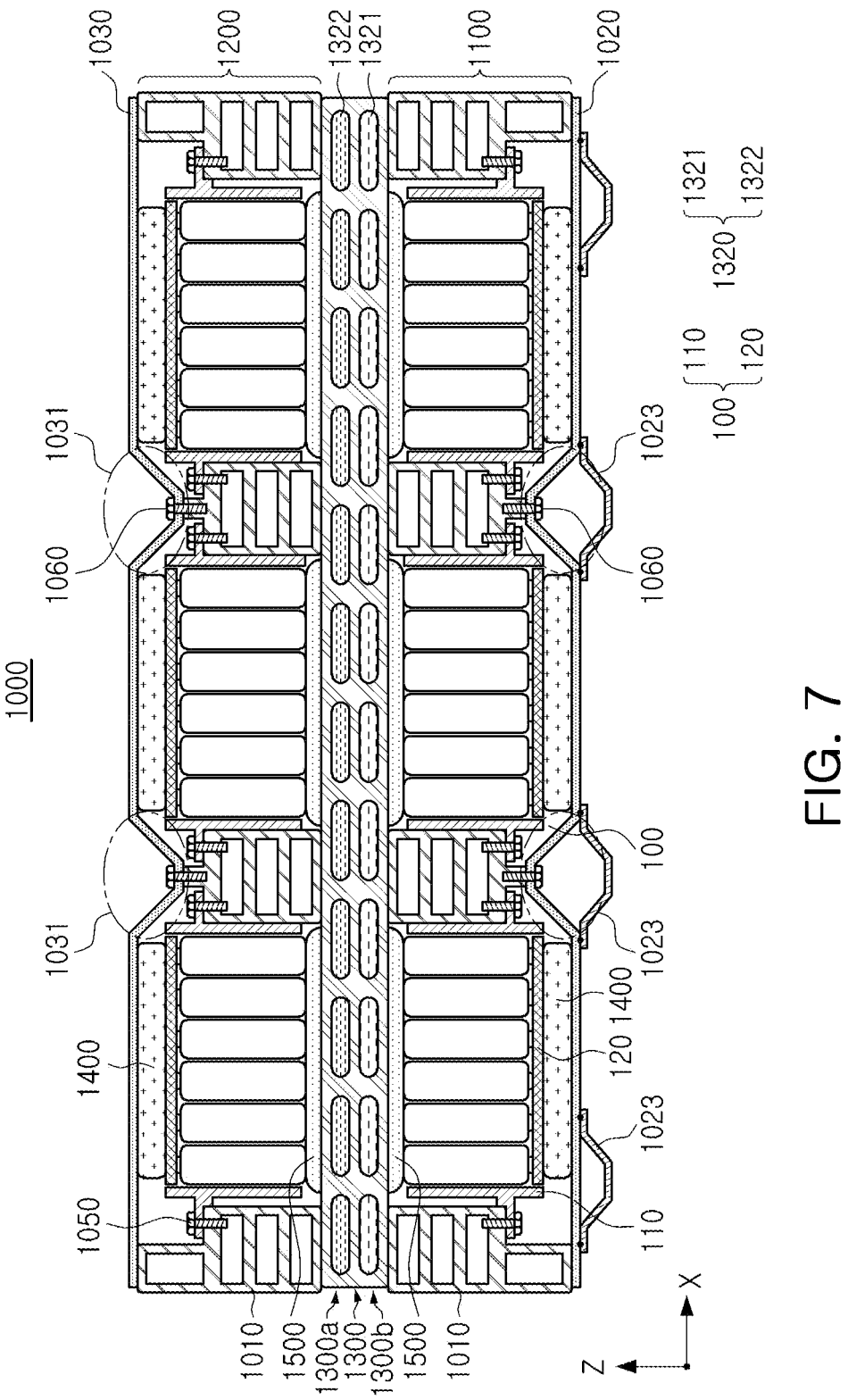
FIG. 7 is a cross-sectional diagram illustrating a battery pack taken in the X-direction according to another embodiment of present disclosure, viewed from the side.

FIG. 7 is a cross-sectional diagram illustrating a battery pack taken in the X-direction according to another embodiment, viewed from the side. FIG. 8 is a cross-sectional diagram illustrating a battery pack taken in the X-direction according to a modified embodiment, viewed from the side.

The battery pack 1000 according to another embodiment may include a heat sink 1300 having a shape different from that of the battery pack 1000 illustrated in FIGS. 1 to 3, which may increase cooling performance of the battery pack 1000.

Referring to FIG. 7, a heat sink 1300 including two cooling flow paths 1321 and 1322 (1320) separated upwardly and downwardly may be disposed between the first sub-battery pack 1100 and the second sub-battery module 1200.

In an embodiment, the heat sink 1300 may include a first cooling flow path 1321 disposed on the first sub-battery pack 1100 side and cooling the plurality of battery modules 100 included in the first sub-battery pack 1100, and a second cooling flow path 1322 disposed on the second sub-battery pack 1200 side and cooling the plurality of battery modules 100 included in the second sub-battery pack 1200.

The first cooling flow path 1321 and the second cooling flow path 1322 may be provided within two metal plates 1310. Hereinafter, a portion including the first cooling flow path 1321 may be referred to as the first sub-heat sink 1300a, and a portion including the second cooling flow path may be referred to as the second sub-heat sink 1300b.

The first sub-heat sink 1300a and the second sub-heat sink 1300b may be integrated (or structurally connected) with each other and may be formed as a single heat sink 1300. In this state, the first sub-heat sink 1300*a* may be disposed on the first sub-battery pack 1100 side, and the second sub-heat sink 1300*b* may be disposed on the second sub-battery pack 1200 side.

The embodiment illustrated in FIG. 7 may have a structure in which the first sub-battery pack 1100 and the second sub-battery pack 1200 may share a heat sink 1300 as in the embodiment illustrated in FIGS. 1 to 3.

The difference is that the first cooling flow path 1321 and the second cooling flow path 1322 may not be connected to each other and may form an independent flow path of coolant, and the supply and discharge of the coolant may also be performed independently. To this end, the heat sink 1300 may include an inlet and an outlet connected to the sub-heat sinks 1300*a* and 1300*b*, respectively.

That is, according to another embodiment, the first sub-battery pack 1100 and the second sub-battery pack 1200 may share a single heat sink 1300, and cooling may be performed independently of each other.

According to another embodiment, the battery pack 1000 has a structure in which the first sub-battery pack 1100 and the second sub-battery pack 1200 may share the heat sink 1300 including two cooling flow paths 1320, thereby improving cooling performance.

Figure 8:
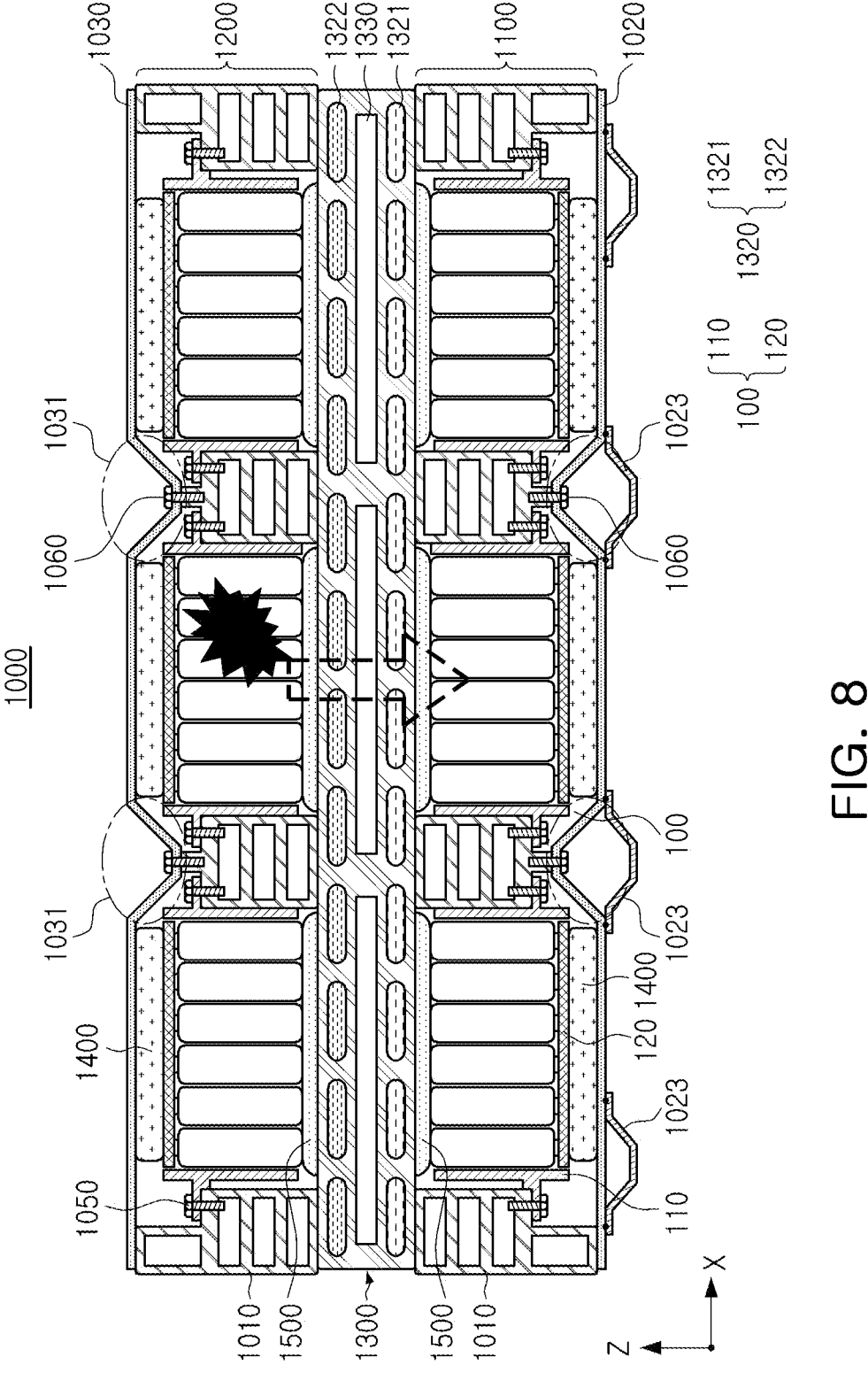
FIG. 8 is a cross-sectional diagram illustrating a battery pack taken in the X-direction according to a modified embodiment of present disclosure, viewed from the side.

Referring to FIG. 8, the heat sink 1300 may include a hollow portion 1330 between the first sub-heat sink 1300*a* and the second sub-heat sink 1300*b* for thermal stability of the battery pack 1000. Accordingly, the first cooling flow path 1321 and the second cooling flow path 1322 may be spaced apart from each other in the vertical direction without being contact with each other by the hollow portion 1330.

The hollow portion 1330 may work as an air gap and an insulating member. In detail, the heat sink 1300 may be formed of a material having excellent heat conduction properties, which may be advantageous in terms of cooling performance and efficiency. However, due to the properties of these materials, when an event occurs in one of the battery cells 10, thermal propagation may easily occur to the adjacent battery module 100 and further to the adjacent sub-battery pack 1100 or 1200.

However, according to another embodiment, the heat sink 1300 may include a hollow portion 1330 working as an insulation member between the first sub-heat sink 1300*a* and the second sub-heat sink 1300*b*, and accordingly, a heat exchange rate between the first cooling flow path 1321 and the second cooling flow path 1322 may be lowered, such that thermal propagation between the first sub-battery pack 1100 and the second sub-battery pack 1200 may be delayed.

For example, by including the above-described structure, when an event occurs in battery cell 10 included in the first sub-battery pack 1100, thermal propagation from at least the first sub-battery pack 1100 to the second sub-battery pack 1200 may be delayed, such that worsening of the events such as thermal runaway of the battery pack 1000 may be prevented, which may be advantageous.

According to the aforementioned embodiments, the battery pack may have an efficient cooling structure.

Also, the battery pack may have improved energy density.

Only specific examples of implementations of certain embodiments are described. Variations, improvements and enhancements of the disclosed embodiments and other embodiments may be made with respect to the disclosure of this patent document.

What is claimed is:

1. A battery pack, comprising:
a first sub-battery pack and a second sub-battery pack each including a plurality of battery modules including a plurality of battery cells arranged in one direction, and stacked in a height direction of the plurality of battery cells; and
a heat sink disposed between the first sub-battery pack and the second sub-battery pack and including a cooling flow path,
wherein the plurality of battery modules comprise a busbar assembly disposed to face the heat sink in the height direction of the plurality of battery cells, and
wherein the plurality of battery cells are disposed between the busbar assembly and the heat sink in the height direction,
wherein the heat sink comprises:
a first sub-heat sink disposed on the first sub-battery pack side and includes a first cooling flow path for cooling the first sub-battery pack;
a second sub-heat sink disposed on the second sub-battery pack side and includes a second cooling flow path for cooling the second sub-battery pack; and
a hollow portion formed between the first sub-heat sink and the second sub-heat sink,
wherein the first sub-heat sink and the second sub-heat sink are structurally connected to each other, and
wherein the first cooling flow path and the second cooling flow path form independent flow paths of coolant, and are configured to allow the supply and discharge of coolant in the first and second cooling flow paths to be provided independently from each other.

2. The battery pack of claim 1,
wherein the plurality of battery cells include:
a case; and
an electrode terminal protruding to one side of the case, and
wherein the other side of the case in which the electrode terminal does not protrude is disposed toward the heat sink.

3. The battery pack of claim 2, wherein the busbar assembly comprises a busbar electrically connecting the electrode terminals to each other, and disposed to cover the plurality of battery cells on one side of the case.

4. The battery pack of claim 1, further comprising:
a heat conductive member disposed between the plurality of battery modules and the heat sink.

5. The battery pack of claim 1, further comprising:
a pack frame coupled to the plurality of battery modules; and
a pack cover coupled to the pack frame and disposed on the other side of the heat sink with respect to the plurality of battery modules.

6. The battery pack of claim 5, further comprising:
a compression pad disposed between the plurality of battery modules and the pack cover.

7. The battery pack of claim 5, wherein the pack cover protrudes toward the pack frame and further includes a fastening portion coupled to the pack frame.

8. The battery pack of claim 7,
wherein the pack cover includes a lower pack cover forming a bottom surface and an upper pack cover forming an upper surface, and
wherein a reinforcement member extending in a width direction of the lower pack cover and protruding in an opposite direction to the fastening portion is further disposed in the lower pack cover.

9. The battery pack of claim 8, wherein the first sub-battery pack and the second sub-battery pack include a plurality of battery modules forming an n×m array (n and m are natural numbers of 1 or more).

10. The battery pack of claim 1, wherein the heat sink includes:

a first inlet and a first outlet communicated with the first sub-heat sink; and a second inlet and a second outlet communicated with the second sub-heat sink.

11. The battery pack of claim 1, wherein the first sub-battery pack and the second sub-battery pack are disposed symmetrically with respect to the heat sink.

12. The battery pack of claim 1, wherein the hollow portion is configured to act as an insulation member to prevent thermal runaway of the battery pack.

13. A battery pack, comprising:

a heat sink; and a plurality of battery modules disposed on upper and lower sides of the heat sink, respectively, in a height direction of the battery pack, and including a plurality of battery cells arranged in one direction and a busbar assembly disposed to face the heat sink in the height direction, wherein the plurality of battery cells are disposed between the busbar assembly and the heat sink in the height direction and arranged such that an electrode terminal of the plurality of battery cells faces an opposite side of the heat sink, wherein the heat sink comprises:

a first sub-heat sink disposed on upper side of the heat sink and includes a first cooling flow path for cooling upper side;

a second sub-heat sink disposed on lower side of the heat sink and includes a second cooling flow path for cooling lower side; and a hollow portion formed between the first sub-heat sink and the second sub-heat sink;

wherein the first sub-heat sink and the second sub-heat sink are structurally connected to each other, and wherein the first cooling flow path and the second cooling flow path form independent flow paths of coolant, and are configured to allow the supply and discharge of coolant in the first and second cooling flow paths to be provided independently from each other.

14. The battery pack of claim 13, further comprising:

a pack cover disposed to cover each of the plurality of battery modules on the side toward the electrode terminal faces.

15. The battery pack of claim 14, further comprising:

a pack frame disposed between the heat sink and the pack cover and coupled to at least one of the plurality of battery modules, the heat sink or the pack cover.

16. The battery pack of claim 15, wherein the busbar assembly is disposed between the plurality of the battery cells and the pack cover in the height direction.

* * * * *